(12) United States Patent
Chester et al.

(10) Patent No.: US 6,787,124 B2
(45) Date of Patent: Sep. 7, 2004

(54) SYNTHETIC POROUS CRYSTALLINE MATERIAL, EMM-1, ITS SYNTHESIS AND USE

(75) Inventors: Arthur W. Chester, Cherry Hill, NJ (US); Sandeep S. Dhingra, Midland, MI (US); Stephen G. Casmer, Bethlehem, PA (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 0 days.

(21) Appl. No.: 10/367,295

(22) Filed: Feb. 14, 2003

(65) Prior Publication Data

US 2003/0185751 A1 Oct. 2, 2003

Related U.S. Application Data

(60) Provisional application No. 60/364,444, filed on Mar. 15, 2002.

(51) Int. Cl.$^7$ .............................................. C01B 39/48
(52) U.S. Cl. ...................... 423/718; 423/706; 423/708; 423/713; 208/46
(58) Field of Search ................................ 423/705, 706, 423/708, 718, 713; 208/46

(56) References Cited

U.S. PATENT DOCUMENTS 2,982,612 A * 5/1961 Barrer et al. ............... 423/718
4,826,667 A * 5/1989 Zones et al. ............... 423/706
6,555,089 B1 * 4/2003 Elomari

FOREIGN PATENT DOCUMENTS

| WO | WO/037360 A | * | 6/2000 |
| WO | WO 02/30819 A1 | | 4/2002 |

OTHER PUBLICATIONS

Corma et al., "Pure Polymorph C of Zeolite Beta Synthesized by Using Framework Isomorphous Substitution as a Structure–Directing Mechanism," Angew. Chem. Int. Ed., vol. 40, No. 12, pp. 2277–2280, Published Jun. 13, 2001.*

* cited by examiner

Primary Examiner—David Sample
(74) Attorney, Agent, or Firm—Ronald D. Hantman; Norby L. Foss

(57) ABSTRACT

A new synthetic porous crystalline material, designated EMM-1, is disclosed having, in its calcined form, the X-ray diffraction pattern of Table 2 above. Also disclosed are methods of making EMM-1 in the presence of HF using various organic nitrogen compounds as directing agents. Aluminum-containing EMM-1 can be produced either by inclusion of Al in the synthesis, or by incorporation of B or Ga in the synthesis, followed by post treatment with aluminum nitrate or other sources of Al. EMM-1 is useful as an acid catalyst and as an adsorbent.

10 Claims, 17 Drawing Sheets

SYNTHETIC POROUS CRYSTALLINE MATERIAL, EMM-1, ITS SYNTHESIS AND USE

This Application is a Non-Provisional of Provisional U.S. Serial No. 60/364,444 filed Mar. 15, 2002.

BACKGROUND OF THE INVENTION

This invention relates to a novel synthetic porous crystalline material, EMM-1, to a method for its preparation and to its use in catalytic conversion of organic compounds.

DESCRIPTION OF THE PRIOR ART

Zeolitic materials, both natural and synthetic, have been demonstrated in the past to have catalytic properties for various types of hydrocarbon conversion. Certain zeolitic materials are ordered, porous crystalline metallosilicates having a definite crystalline structure as determined by X-ray diffraction, within which there are a large number of smaller cavities, which may be interconnected by a number of still smaller channels or pores. These cavities and pores are uniform in size within a specific zeolitic material. Since the dimensions of these pores are such as to accept for adsorption molecules of certain dimensions while rejecting those of larger dimensions, these materials have come to be known as "molecular sieves" and are utilized in a variety of ways to take advantage of these properties.

Such molecular sieves, both natural and synthetic, include a wide variety of positive ion-containing crystalline silicates. These silicates can be described as a rigid three-dimensional framework of $SiO_4$ and Periodic Table Group IIIA element oxide, e.g., $AlO_4$, in which the tetrahedra are cross-linked by the sharing of oxygen atoms whereby the ratio of the total Group IIIA element and silicon atoms to oxygen atoms is 1:2. The electrovalence of the tetrahedra containing the Group IIIA element is balanced by the inclusion in the crystal of a cation, for example an alkali metal or an alkaline earth metal cation. This can be expressed wherein the ratio of the Group IIIA element, e.g., aluminum, to the number of various cations, such as Ca/2, Sr/2, Na, K or Li, is equal to unity. One type of cation may be exchanged either entirely or partially with another type of cation utilizing ion exchange techniques in a conventional manner. By means of such cation exchange, it has been possible to vary the properties of a given silicate by suitable selection of the cation. The spaces between the tetrahedra are occupied by molecules of water prior to dehydration.

Although most frequently encountered in aluminosilicate form, many zeolites are known in silicate and borosilicate forms. For example, silicalite is a silicate form of ZSM-5 and is disclosed in U.S. Pat. No. 4,061,724, whereas AMS-1B is a borosilicate form of ZSM-5 and is disclosed in U.S. Pat. No. 4,269,813. It is also known to produce zeolite structures in which part or all of the silicon is replaced by other tetravalent elements, such as tin, titanium and/or germanium.

Many zeolites are synthesized in the presence of an organic directing agent, such as an organic nitrogen compound. For example, ZSM-5 may be synthesized in the presence of tetrapropylammonium cations and zeolite MCM-22 may be synthesized in the presence of hexamethyleneimine.

It is also known to use fluoride-containing compounds, such as hydrogen fluoride, as mineralizing agents in zeolite synthesis. For example, EP-A-337,479 discloses the use of hydrogen fluoride in water at low pH to mineralize silica in glass for the synthesis of ZSM-5.

One known zeolite is zeolite beta, the structure and synthesis of which in the presence of tetraethylammonium cations is disclosed in U.S. Pat. No. 3,308,069, the entire contents of which are incorporated herein by reference. As conventionally synthesized, zeolite beta is a highly faulted intergrowth of two polymorphs, A and B, which are normally found in a 60:40 ratio. However, the existence of a third polymorph, polymorph C, has also been proposed but to date this material has not been detected experimentally.

According to the present invention, a zeolite material, designated EMM-1, has been synthesized, which appears to have the hypothetical structure of the polymorph C of zeolite beta, by crystallizing a synthesis mixture which contains silica, germania, fluoride ions and an organonitrogen-directing agent.

SUMMARY OF THE INVENTION

The present invention is directed to a novel porous crystalline material, EMM-1, having the unit cell structure defined in Table 1 below and having, in its calcined form, an X-ray diffraction pattern including values substantially as set forth in Table 2 below.

The invention further resides in a method for preparing EMM-1 and in the conversion of organic compounds contacted with an active form of EMM-1.

DETAILED DESCRIPTION OF THE PREFERRED EMBODIMENTS

Figure 1:
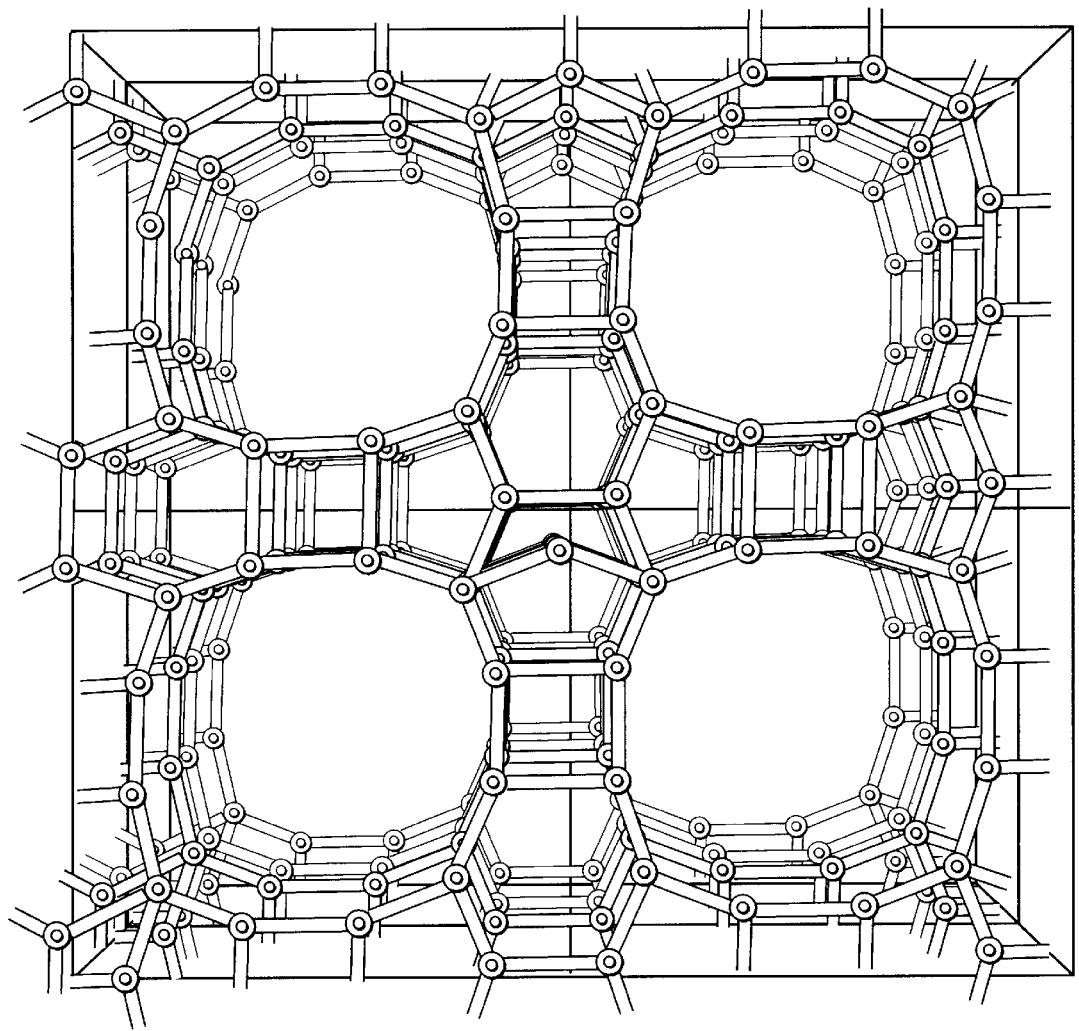
FIG. 1 is a schematic illustration of a unit cell of EMM-1, showing the positions of the tetrahedral atoms.

The synthetic porous crystalline material of this invention, EMM-1, has the structure of the-previously hypothetical polymorph C of zeolite beta and in particular is composed of three sets of linear 12-membered ring channels. The structure of EMM-1 may be defined by its unit cell, which is the smallest structural unit containing all the structural elements of the material and which is illustrated in FIG. 1. Table 1 lists the positions of each tetrahedral atom in the unit cell in nanometers; each tetrahedral atom being bonded to an oxygen atom which is also bonded to an adjacent tetrahedral atom. Since the tetrahedral atoms may move about due to other crystal forces (presence of inorganic or organic species, for example), a range of ±0.05 nm is implied for each coordinate position.

TABLE 1

|  | X | Y | Z |
|---|---|---|---|
| T1 | 7.918 | 1.599 | 11.501 |
| T2 | 0.000 | 1.501 | 11.385 |
| T3 | 2.462 | 2.462 | 9.750 |
| T4 | 4.892 | 11.211 | 11.501 |
| T5 | 0.000 | 11.309 | 11.385 |
| T6 | 10.348 | 10.348 | 9.750 |
| T7 | 11.211 | 7.918 | 5.001 |
| T8 | 11.309 | 0.000 | 4.885 |
| T9 | 10.348 | 2.462 | 3.250 |
| T10 | 1.599 | 4.892 | 5.001 |
| T11 | 1.501 | 0.000 | 4.885 |
| T12 | 2.462 | 10.348 | 3.250 |
| T13 | 4.892 | 1.599 | 1.499 |
| T14 | 0.000 | 1.501 | 1.614 |
| T15 | 7.918 | 11.211 | 1.499 |
| T16 | 0.000 | 11.309 | 1.614 |
| T17 | 1.599 | 7.918 | 7.999 |
| T18 | 1.501 | 0.000 | 8.115 |
| T19 | 11.211 | 4.892 | 7.999 |
| T20 | 11.309 | 0.000 | 8.115 |
| T21 | 4.892 | 11.211 | 1.499 |
| T22 | 10.348 | 10.348 | 3.250 |
| T23 | 7.918 | 1.599 | 1.499 |
| T24 | 2.462 | 2.462 | 3.250 |
| T25 | 1.599 | 4.892 | 7.999 |
| T26 | 2.462 | 10.348 | 9.750 |
| T27 | 11.211 | 7.918 | 7.999 |
| T28 | 10.348 | 2.462 | 9.750 |
| T29 | 7.918 | 11.211 | 11.501 |
| T30 | 4.892 | 1.599 | 11.501 |
| T31 | 11.211 | 4.892 | 5.001 |
| T32 | 1.599 | 7.918 | 5.001 |

EMM-1 can be prepared in essentially pure form (>95 wt % polymorph C of zeolite beta) and has an X-ray diffraction pattern which is distinguished from the patterns of other known as-synthesized or thermally treated crystalline materials by the lines listed in Table 2 below.

TABLE 2

| d-Spacing (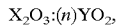) | Relative Intensity |
|---|---|
| 12.51 ± 0.39 | M-S |
| 9.04 ± 0.26 | M-VS |
| 5.80 ± 0.15 | VW |
| 5.27 ± 0.15 | VW |
| 5.19 ± 0.15 | VW |
| 4.55 ± 0.13 | VW-W |
| 4.21 ± 0.13 | VW |
| 4.12 ± 0.12 | VW-W |
| 4.01 ± 0.11 | VS |
| 3.83 ± 0.11 | VW |
| 3.57 ± 0.11 | VW |
| 3.28 ± 0.09 | VW |
| 3.17 ± 0.09 | VW |
| 3.03 ± 0.08 | VW |
| 2.90 ± 0.08 | VW |
| 2.48 ± 0.07 | VW |

These X-ray diffraction data were collected with a Scintag diffraction system, equipped with a germanium solid state detector, using copper K-alpha radiation. The diffraction data were recorded by step-scanning at 0.03 degrees of 2-theta, where theta is the Bragg angle, and a counting time of 2 seconds for each step. The interplanar spacings, d's, were calculated in Angstrom units, and the relative intensities of the lines, $I/I_o$ is one-hundredth of the intensity of the strongest line, above background, were derived with the use of a profile fitting routine (or second derivative algorithm). The intensities are uncorrected for Lorentz and polarization effects. The relative intensities are given in terms of the symbols VS=very strong (80–100), S=strong (60–80), M=medium (40–60), W=weak (20–40), and VW=very weak (0–20). It should be understood that diffraction data listed for this sample as single lines may consist of multiple overlapping lines which under certain conditions, such as differences in crystallographic changes, may appear as resolved or partially resolved lines. Typically, crystallographic changes can include minor changes in unit cell parameters and/or a change in crystal symmetry, without a change in the structure. These minor effects, including changes in relative intensities, can also occur as a result of differences in cation content, framework composition, nature and degree of pore filling, crystal size and shape, preferred orientation and thermal and/or hydrothermal history.

The crystalline material of this invention has a composition involving the molar relationship:

$$X_2O_3:(n)YO_2,$$

wherein X is a trivalent element, such as aluminum, boron, iron, indium, and/or gallium; Y is a tetravalent element such as silicon, tin, titanium and/or germanium; and n is at least about 35, such as about 35 to ∞, and usually from about 200 to ∞. Current EMM-1 syntheses have all contained germanium and it is believed that the presence of germanium, either with or without additional tetravalent elements, enhances the stability of the structure.

Processes for synthesizing EMM-1 employ fluorides, in particular HF, as a mineralizing agent and hence, in its as-synthesized form, EMM-1 has a formula, on an anhydrous basis and in terms of moles of oxides per mole of $YO_2$, as follows:

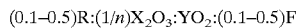

wherein R is an organic moiety. The R and F components, which are associated with the material as a result of their presence during crystallization, are easily removed by post-crystallization methods hereinafter more particularly described.

The crystalline material of the invention is thermally stable and in the calcined form exhibits a high surface area and significant hydrocarbon sorption capacity.

To the extent desired and depending on the $X_2O_3/YO_2$ molar ratio of the material, any cations in the as-synthesized EMM-1 can be replaced in accordance with techniques well known in the art, at least in part, by ion exchange with other cations. Preferred replacing cations include metal ions, hydrogen ions, hydrogen precursor, e.g., ammonium ions and mixtures thereof. Particularly preferred cations are those which tailor the catalytic activity for certain hydrocarbon conversion reactions. These include hydrogen, rare earth metals and metals of Groups IIA, IIIA, IVA, VA, IB, IIB, IIIB, IVB, VB, VIB, VIIB and VIII of the Periodic Table of the Elements.

The crystalline material of the invention may be subjected to treatment to remove part or all of any organic constituent. This is conveniently effected by thermal treatment in which the as-synthesized material is heated at a temperature of at least about 370° C. for at least 1 minute and generally not longer than 20 hours. While subatmospheric pressure can be employed for the thermal treatment, atmospheric pressure is desired for reasons of convenience. The thermal treatment can be performed at a temperature up to about 925° C. The thermally treated product, especially in its metal, hydrogen and ammonium forms, is particularly useful in the catalysis of certain organic, e.g., hydrocarbon, conversion reactions.

The crystalline material of the invention can be intimately combined with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be in the composition by way of cocrystallization, exchanged into the composition to the extent a Group IIIA element, e.g., aluminum, is in the structure, impregnated therein or intimately physically admixed therewith. Such component can be impregnated in or on to it such as, for example, in the case of platinum, by treating the silicate with a solution containing a platinum metal-containing ion. Thus, suitable platinum compounds for this purpose include chloroplatinic acid, platinous chloride and various compounds containing platinum amine complexes.

The crystalline material of this invention, when employed either as an adsorbent or as a catalyst in an organic compound conversion process should be dehydrated, at least partially. This can be done by heating to a temperature in the range of 200° C. to about 370° C. in an atmosphere such as air, nitrogen, etc., and at atmospheric, subatmospheric or superatmospheric pressures for between 30 minutes and 48 hours. Dehydration can also be performed at room temperature merely by placing the EMM-1 in a vacuum, but a longer time is required to obtain a sufficient amount of dehydration.

The crystalline material of the invention can be prepared from a reaction mixture containing sources of water, an oxide of a tetravalent element Y, wherein Y comprises germanium and the mole fraction of germanium in Y is 0.2 to 0.5, a directing agent (R) as described below, a trivalent element as described above, and fluoride ions, said reaction mixture having a composition, in terms of mole ratios of oxides, within the following ranges:

| Reactants | Useful | Preferred |
|---|---|---|
| $H_2O/YO_2$ | 3 to 10 | 4 to 8 |
| $F/YO_2$ | 0.1 to 0.5 | 0.2 to 0.4 |
| $R/YO_2$ | 0.1 to 0.5 | 0.13 to 0.25 |
| $X_2O_3/YO_2$ | 0 to 0.03 | 0 to 0.01 |

The organic directing agent R used herein is preferably selected from the group consisting of ammonium cations listed in Table 3.

TABLE 3

| Name | Chemical Abstracts Name | Structural Formula |
|---|---|---|
| Diquat-6 | N,N,N,N',N',N'-hexamethyl-1,6-Hexanediaminium | $(CH_3)_3N^+(CH_2)_6N^+(CH_3)_3$ |
| Diquat-10 | N,N,N,N',N',N'-hexamethyl-1,10-Decanediaminium | $(CH_3)_3N^+(CH_2)_{10}N^+(CH_3)_3$ |
| Diquat-11 | N,N,N,N',N',N'-hexamethyl-1,11-Undecanediaminium | $(CH_3)_3N^+(CH_2)_{11}N^+(CH_3)_3$ |
| Diquat-14 | N,N,N,N',N',N'-hexamethyl-1,14-Tetradecanediaminium | $(CH_3)_3N^+(CH_2)_{14}N^+(CH_3)_3$ |
| (methylpiperidine)$_2$ Diquat$_2$ | 1,1'-(1,2-ethanediyl)bis[1-methyl-Piperidinium | (structure) |
| benzyltrimethyl-ammonium | N,N,N-trimethyl-Benzenemethanaminium | $PhCH_2N^+(CH_3)_3$ |
| bicyclo NEt$_4$ diquat | (3aR,4aS,7aR,8aS)-rel-2,2,6,6-tetraethyl-1,2,3,3a,4,4a,5,6,7,7a,8,8a-dodecahydro-4,8-Ethenobenzo[1,2-c:4,5-c']dipyrrolium, | (structure) |
| tetraethyl ammonium | N,N,N-triethyl-Ethanaminium | $(C_2H_5)_4N^+$ |

Crystallization of EMM-1 can be carried out at either static or stirred conditions in a suitable reactor vessel, such as for example, polypropylene jars or Teflon®-lined or stainless steel autoclaves, at a temperature of about 135° C. to about 165° C. for a time sufficient for crystallization to occur at the temperature used, e.g., from about 24 hours to about 30 days. Thereafter, the crystals are separated from the liquid and recovered.

It should be realized that the reaction mixture components can be supplied by more than one source. The reaction mixture can be prepared either batch-wise or continuously. Crystal size and crystallization time of the new crystalline material will vary with the nature of the reaction mixture employed and the crystallization conditions.

Synthesis of the new crystals may be facilitated by the presence of at least 0.01 percent, preferably 0.10 percent and still more preferably 1 percent, seed crystals (based on total weight) of crystalline product.

Aluminosilicate EMM-1 can be prepared either by inclusion of Al in the synthesis, or by incorporation of B or Ga in the synthesis, followed by post treatment with aluminum nitrate or other sources of Al.

The crystals prepared by the instant invention can be shaped into a wide variety of particle sizes. Generally speaking, the particles can be in the form of a powder, a granule, or a molded product, such as an extrudate having particle size sufficient to pass through a 2 mesh (Tyler) screen and be retained on a 400 mesh (Tyler) screen. In cases where the catalyst is molded, such as by extrusion, the crystals can be extruded before drying or partially dried and then extruded.

The crystalline material of this invention can be used as an adsorbent or, particularly in its aluminosilicate form, as a catalyst to catalyze a wide variety of chemical conversion processes including many of present commercial/industrial importance. Examples of chemical conversion processes, which are effectively catalyzed by the crystalline material of this invention, by itself or in combination with one or more other catalytically active substances including other crystalline catalysts, include those requiring a catalyst with acid activity.

As in the case of many catalysts, it may be desirable to incorporate the new crystal with another material resistant to the temperatures and other conditions employed in organic conversion processes. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with the new crystal, i.e., combined therewith or present during synthesis of the new crystal, which is active, tends to change the conversion and/or selectivity of the catalyst in certain organic conversion processes. Inactive materials suitably serve as diluents to control the amount of conversion in a given process so those products can be obtained in an economic and orderly manner without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use it is desirable to prevent the catalyst from breaking down into powder-like materials. These clay and/or oxide binders have been employed normally only for the purpose of improving the crush strength of the catalyst.

Naturally occurring clays which can be composited with the new crystal include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with the present crystal also include inorganic oxides, such as silica, zirconia, titania, magnesia, beryllia, alumina, and mixtures thereof.

In addition to the foregoing materials, the new crystal can be composited with a porous matrix material such as silica-alumina, silica-magnesia, silica-zirconia, silica-thoria, silica-beryllia and silica-titania as well as ternary compositions such as silica-alumina-thoria, silica-alumina-zirconia, silica-alumina-magnesia and silica-magnesia-zirconia.

The relative proportions of finely divided crystalline material and inorganic oxide matrix vary widely, with the crystal content ranging from about 1 to about 90 percent by weight and more usually, particularly when the composite is prepared in the form of beads, in the range of about 2 to about 80 weight percent of the composite.

In order to more fully illustrate the nature of the invention and the manner of practicing same, the following examples are presented.

EXAMPLE 1

Synthesis of EMM-1 Using (methylpiperidine)$_2$-Diquat$_2$ Dihydroxide 10.0 grams of Syton® HT-50 colloidal silica (50 wt % solution), 8.15 grams of (methylpiperidine)$_2$-Diquat$_2$ dihydroxide solution, 1.74 grams of germanium oxide and 1.40 grams of HF (48 wt %) were added to a 30 mL plastic bottle. The mixture was homogenized, the bottle was placed in a 300 mL autoclave, then the autoclave was ramped to 150° C. and held at this temperature for 336 hours. The mole ratios of the reactants were as follows

| | |
|---|---|
| SiO$_2$ | 1.0 |
| GeO$_2$ | 0.2 |
| (methylpiperidine)$_2$-Diquat$_2$ dihydroxide | 0.2 |
| HF | 0.4 |
| H$_2$O | 6.4 |

Figure 2:
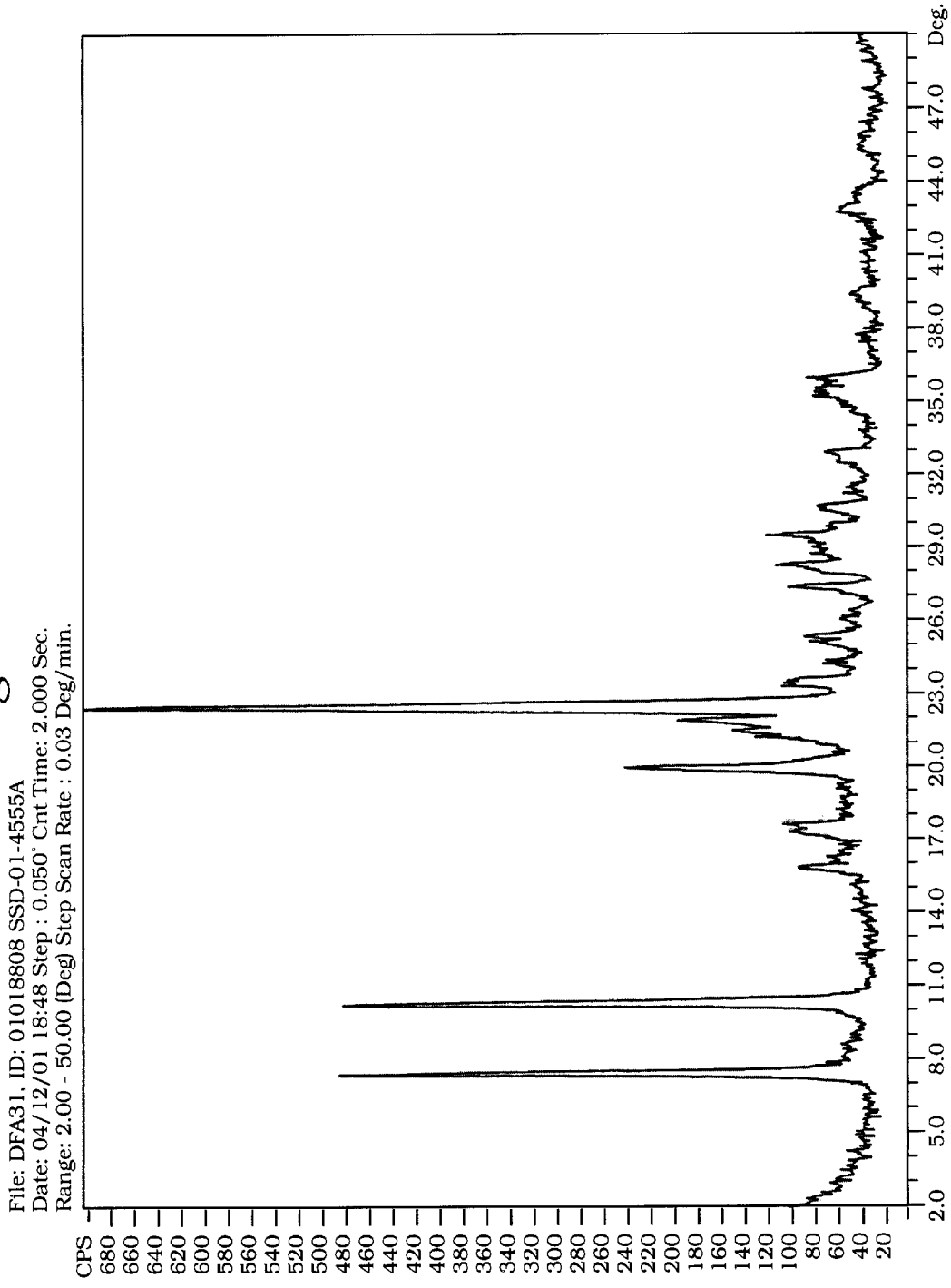
FIGS. 2 and 3 show the X-ray diffraction patterns of the as-synthesized and as-calcined products, respectively, of Example 1.

After the reaction was over, the solid was recovered by filtration and washed with deionized (DI) water. The solid was dried under infra-red lamps in air. The EMM-1 material thus obtained had the powder X-ray diffraction pattern shown in FIG. 2.

Figure 3:
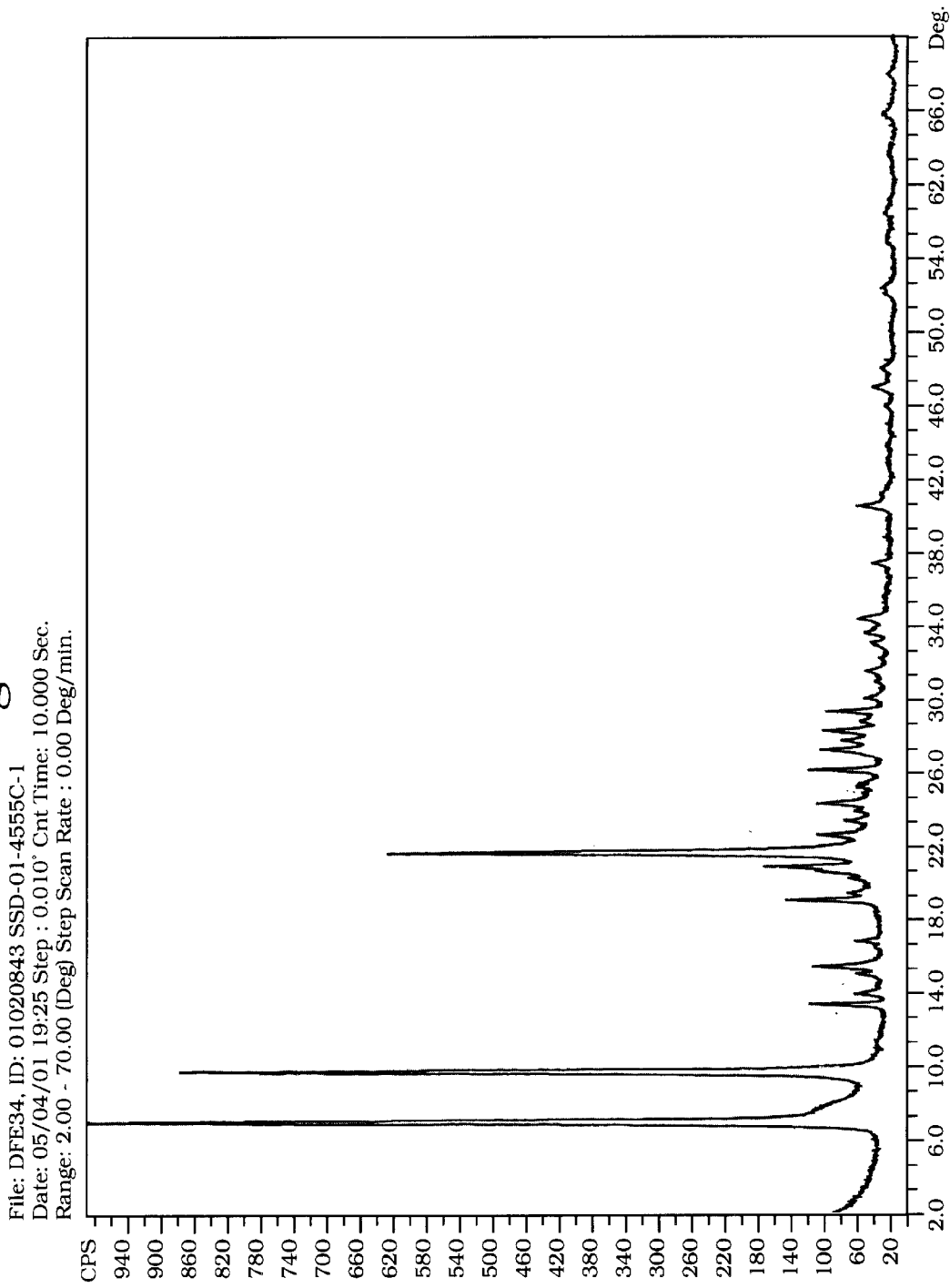

The as-synthesized material was calcined at 540° C. for 8 hours in nitrogen and subsequently for 8 hours in air. The calcined material had X-ray diffraction pattern shown in FIG. 3. The physical properties of the calcined EMM-1 were as follows:

| BET Surface Area M$^2$/g | Micropore Volume | Water Sorption (g/100 g) | Cyclo-hexane Sorption (g/100 g) | n-hexane Sorption (g/100 g) |
|---|---|---|---|---|
| 513 | 0.2008 | 5.7 | 16.1 | 12.5 |

EXAMPLE 2

Synthesis of EMM-1 Using (methylpiperidine)$_2$-Diquat$_2$ Dihydroxide

Example 1 was repeated but with the mole ratios of the reactants being as follows:

| | |
|---|---|
| SiO$_2$ | 1.0 |
| GeO$_2$ | 0.5 |
| (methylpiperidine)$_2$-Diquat$_2$ dihydroxide | 0.2 |
| HF | 0.4 |
| H$_2$O | 6.4 |

Figure 4:
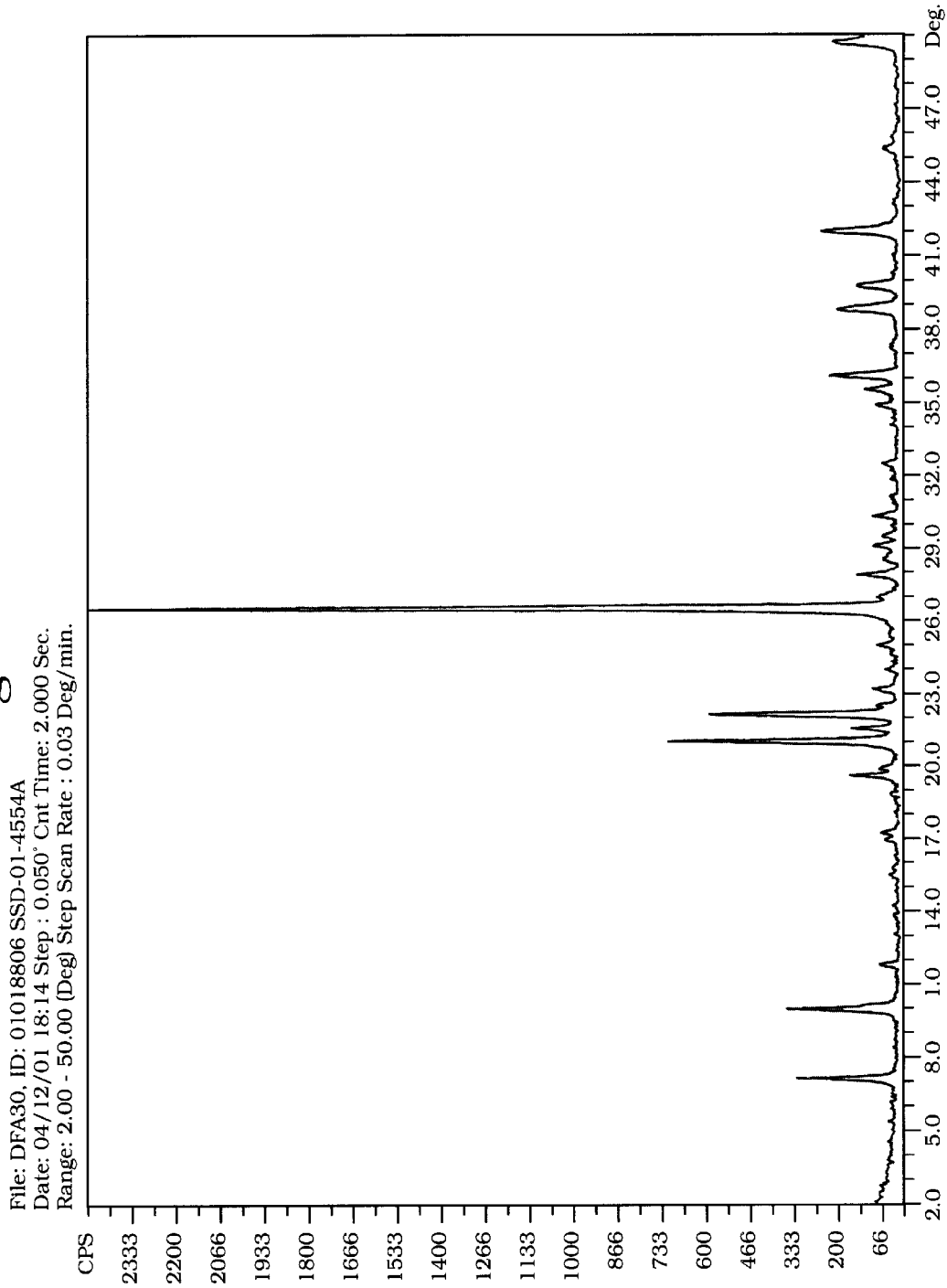
FIG. 4 shows the X-ray diffraction patterns of the as-synthesized product of Example 2.

After the reaction was over, the solid was recovered by filtration and washed with DI water and dried under infra-red lamps in air. The material thus obtained had the powder X-ray diffraction pattern shown in FIG. 4 demonstrating that the material was composed of EMM-1 with some amount of quartz as an impurity.

EXAMPLE 3

Synthesis of EMM-1 Using Benzyltrimethyl Ammonium Hydroxide 10.0 grams of Syton® HT-50 colloidal silica (50 wt % solution), 12.0 grams of benzyltrimethyl ammonium hydroxide solution, 1.74 grams of germanium oxide and 1.04 grams of HF (48 wt %) were added to a 30 mL plastic bottle. The mixture was homogenized, the bottle was placed into and autoclave, and then the autoclave was ramped to 150° C. and held for 336 hours. The mole ratios of the reactants were as follows:

| | |
|---|---|
| $SiO_2$ | 1.0 |
| $GeO_2$ | 0.2 |
| Benzyltrimethyl ammonium dihydroxide | 0.3 |
| HF | 0.3 |
| $H_2O$ | 9.0 |

Figure 5:
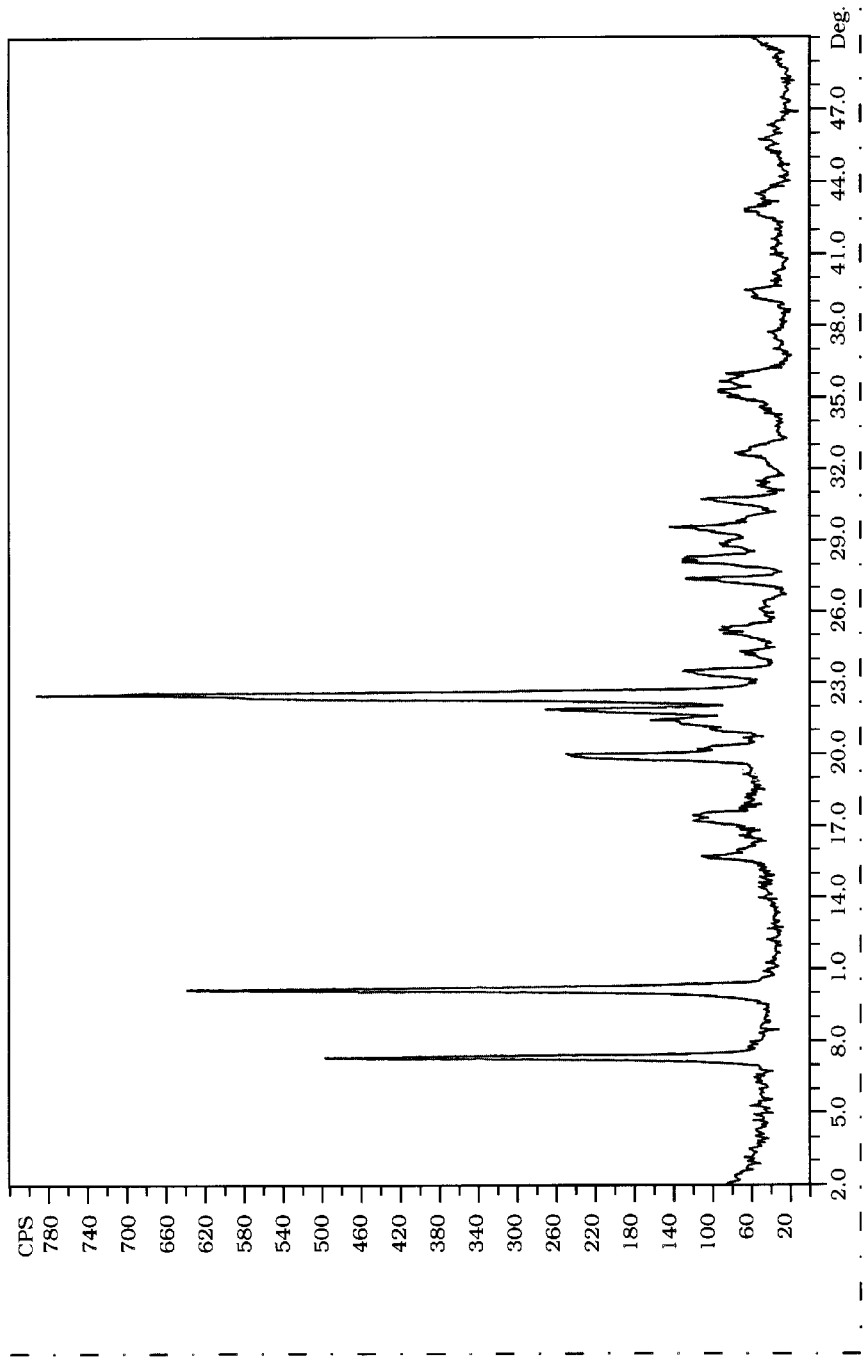
FIGS. 5 and 6 show the X-ray diffraction patterns of the as-synthesized and as-calcined products, respectively, of Example 3.
Figure 6:
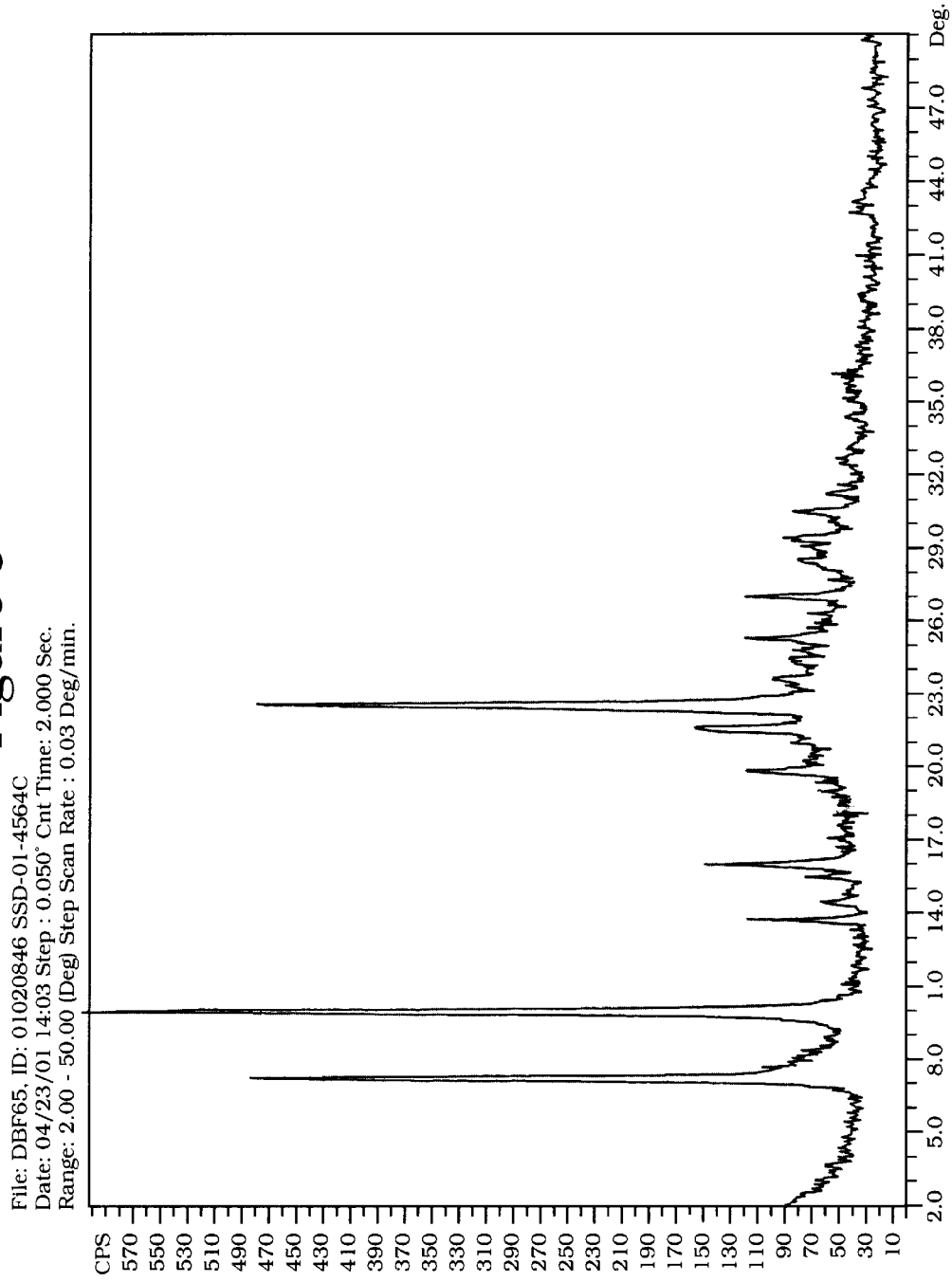

After the reaction was complete, the solid was recovered by filtration, washed with DI water and dried under infra-red lamps in air. The material thus obtained had the powder X-ray diffraction pattern for pure EMM-1 shown in FIG. 5. The as-synthesized material was calcined at 540° C. for 8 hours in nitrogen and subsequently for 8 hours in air and the calcined material had the X-ray pattern shown in FIG. 6.

EXAMPLE 4

Synthesis of EMM-1 Using Bicyclo $NEt_4$ Diquat Dihydroxide 10.0 grams of Syton® HT-50 colloidal silica (50 wt % solution), 12.8 grams of bicyclo $NEt_4$ diquat dihydroxide solution, 4.35 grams of germanium oxide and 1.04 grams of HF (48 wt %) were added to a 30 mL plastic bottle. The mixture was homogenized, the bottle was placed into an autoclave, and then the autoclave was ramped to 150° C. and held for 336 hours. The mole ratios of the reactants were as follows:

| | |
|---|---|
| $SiO_2$ | 1.0 |
| $GeO_2$ | 0.5 |
| Bicyclo $Net_4$ Diquat dihydroxide | 0.3 |
| HF | 0.3 |
| $H_2O$ | 9.4 |

Figure 7:
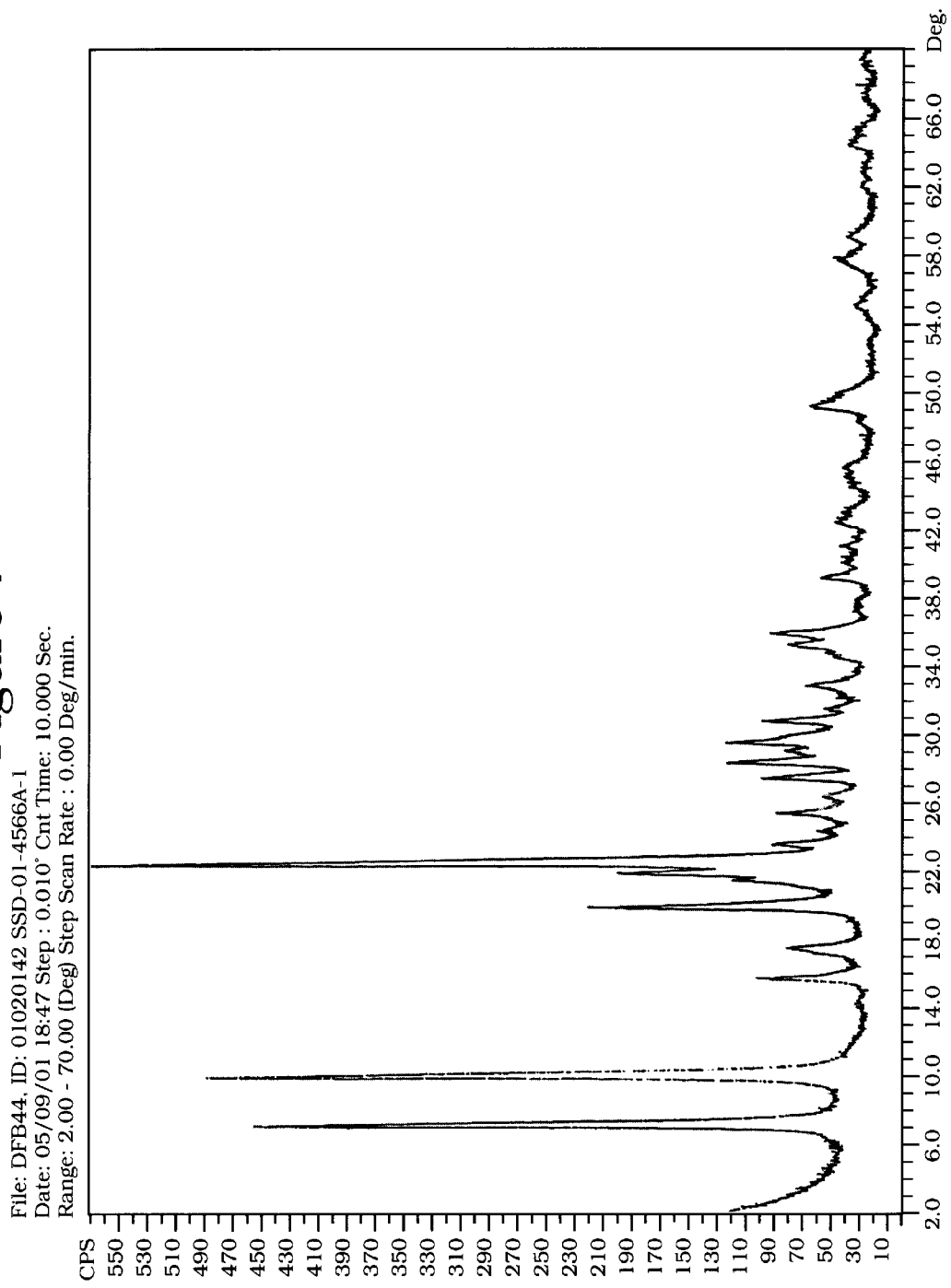
FIG. 7 shows the X-ray diffraction patterns of the as-synthesized product of Example 4.

After the reaction was complete, the solid was recovered by filtration, washed with DI water and dried under infra-red lamps in air. The material thus obtained had the powder X-ray diffraction pattern for pure EMM-1 shown in FIG. 7.

EXAMPLE 5

Synthesis of EMM-1 using Diquat-10 Dihydroxide 10.0 grams of Syton® HT-50 colloidal silica (50 wt % solution), 12.12 grams of Diquat-10 dihydroxide solution (obtained by anion exchange of commercially available Diquat-10 bromide), 1.74 grams of germanium oxide and 1.40 grams of HF (48 wt %) were added to a 30 mL plastic bottle. The mixture was homogenized, the bottle was placed into an autoclave, and then the autoclave was ramped to 150° C. and held for 336 hours. The mole ratios of the reactants were as follows:

| | |
|---|---|
| $SiO_2$ | 1.0 |
| $GeO_2$ | 0.2 |
| Diquat-10 | 0.2 |
| HF | 0.4 |
| $H_2O$ | 8.7 |

Figure 8:
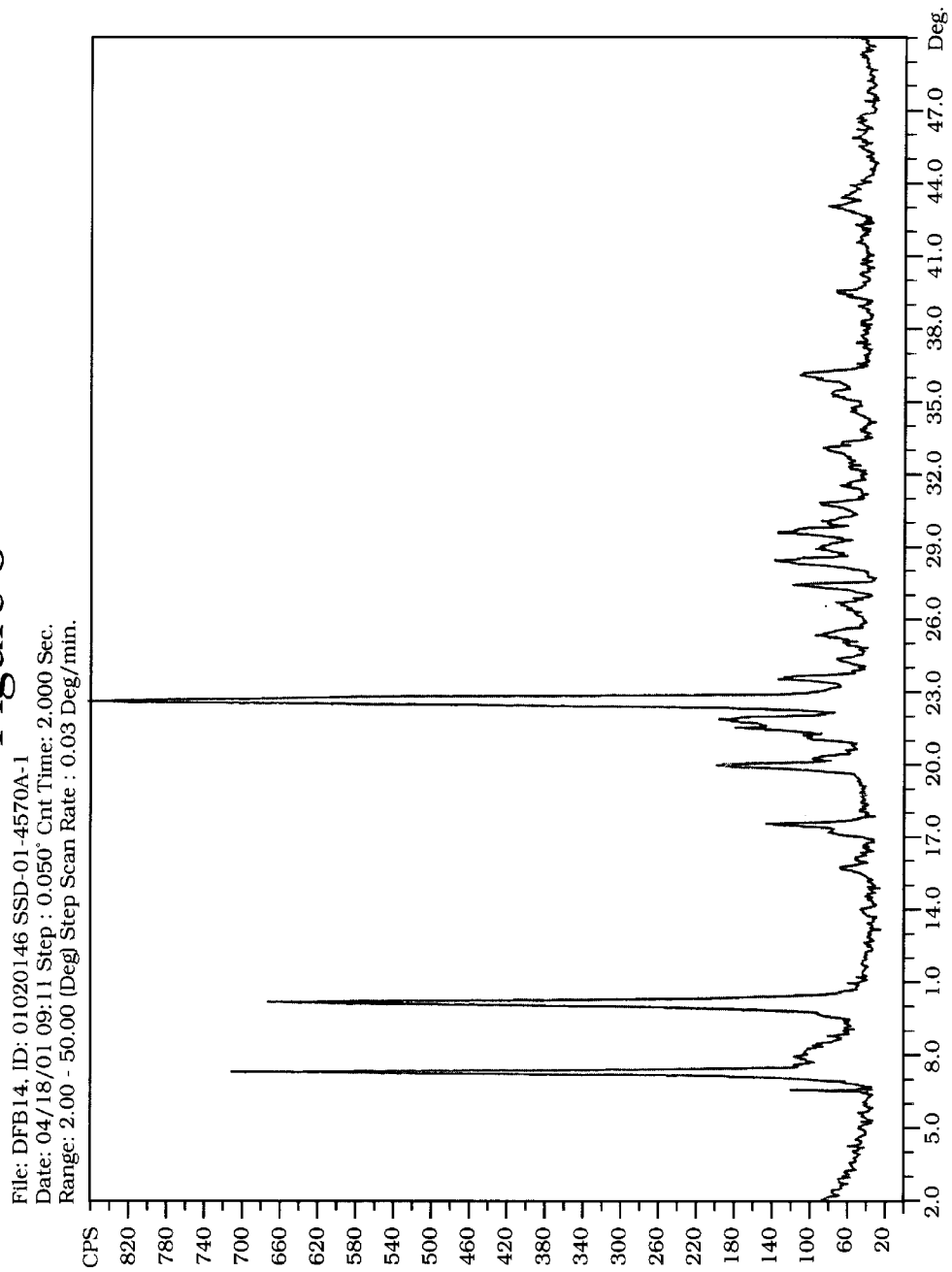
FIGS. 8 and 9 show the X-ray diffraction patterns of the as-synthesized and as-calcined products, respectively, of Example 5.
Figure 9:
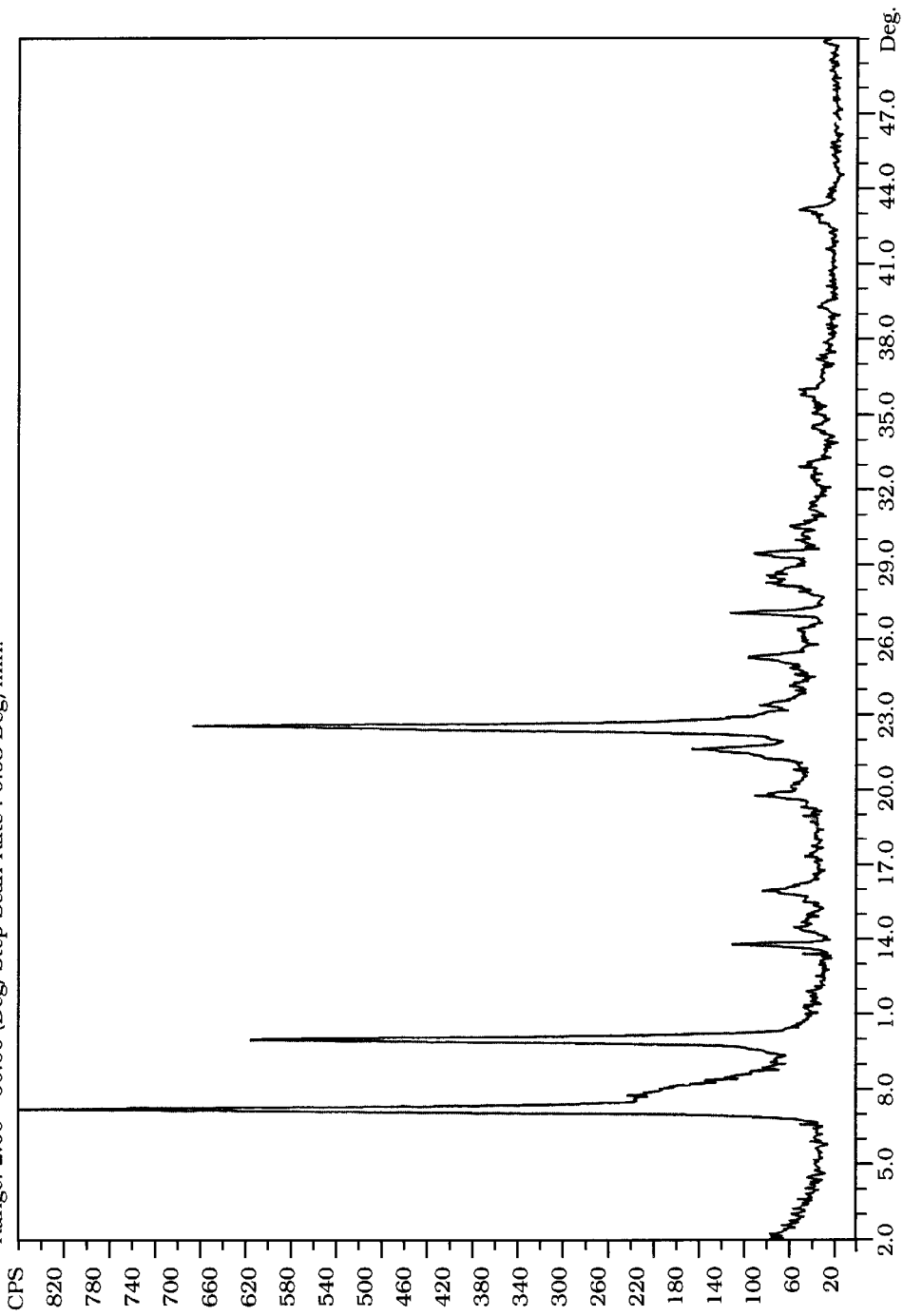

After the reaction was complete, the solid was recovered by filtration, washed with DI water and dried under infra-red lamps in air. The material thus obtained had the powder X-ray diffraction pattern for pure EMM-1 shown in FIG. 8. The as-synthesized material was calcined at 540° C. for 8 hours in nitrogen and subsequently for 8 hours in air. The calcined material had the X-ray pattern shown in FIG. 9 which indicated that the material contained traces of the polymorphs A and B of zeolite beta as seen by the presence of a broad peak around 8 degrees 2-theta.

EXAMPLE 6

Synthesis of EMM-1 Using Diquat-11 Dihydroxide 10.0 grams of Syton® HT-50 colloidal silica (50 wt % solution), 13.37 grams of Diquat-11 dihydroxide solution, 1.74 grams of germanium oxide and 1.40 grams of HF (48 wt %) were added to a 30 mL plastic bottle. The mixture was homogenized, the plastic bottle was placed into an autoclave, and then the autoclave was ramped to 150° C. and held for 336 hours. The mole ratios of the reactants were as follows:

| | |
|---|---|
| $SiO_2$ | 1.0 |
| $GeO_2$ | 0.2 |
| Diquat-11 dihydroxide | 0.2 |
| HF | 0.4 |
| $H_2O$ | 9.3 |

Figure 10:
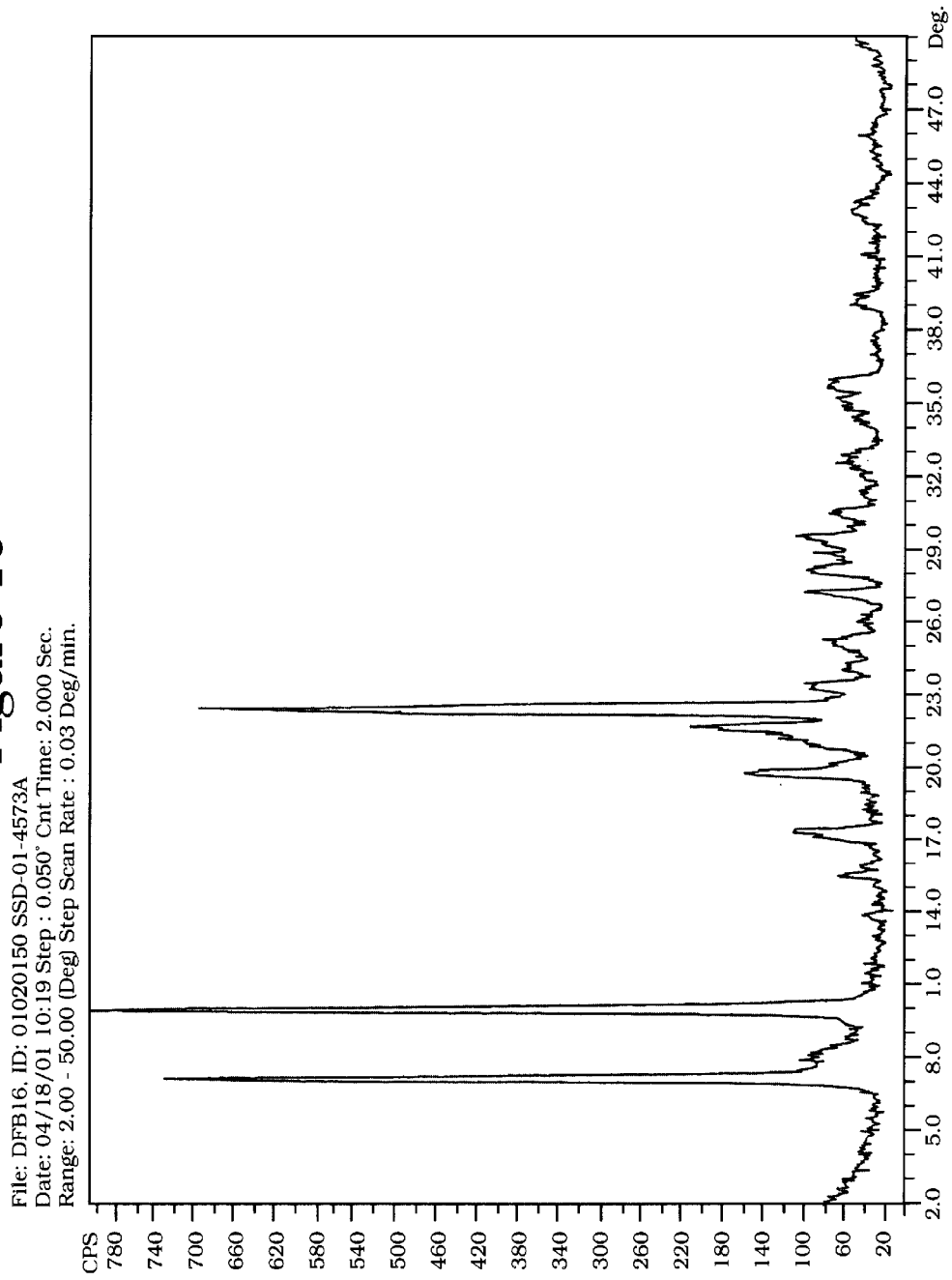
FIGS. 10 and 11 show the X-ray diffraction patterns of the as-synthesized and as-calcined products, respectively, of Example 6.
Figure 11:
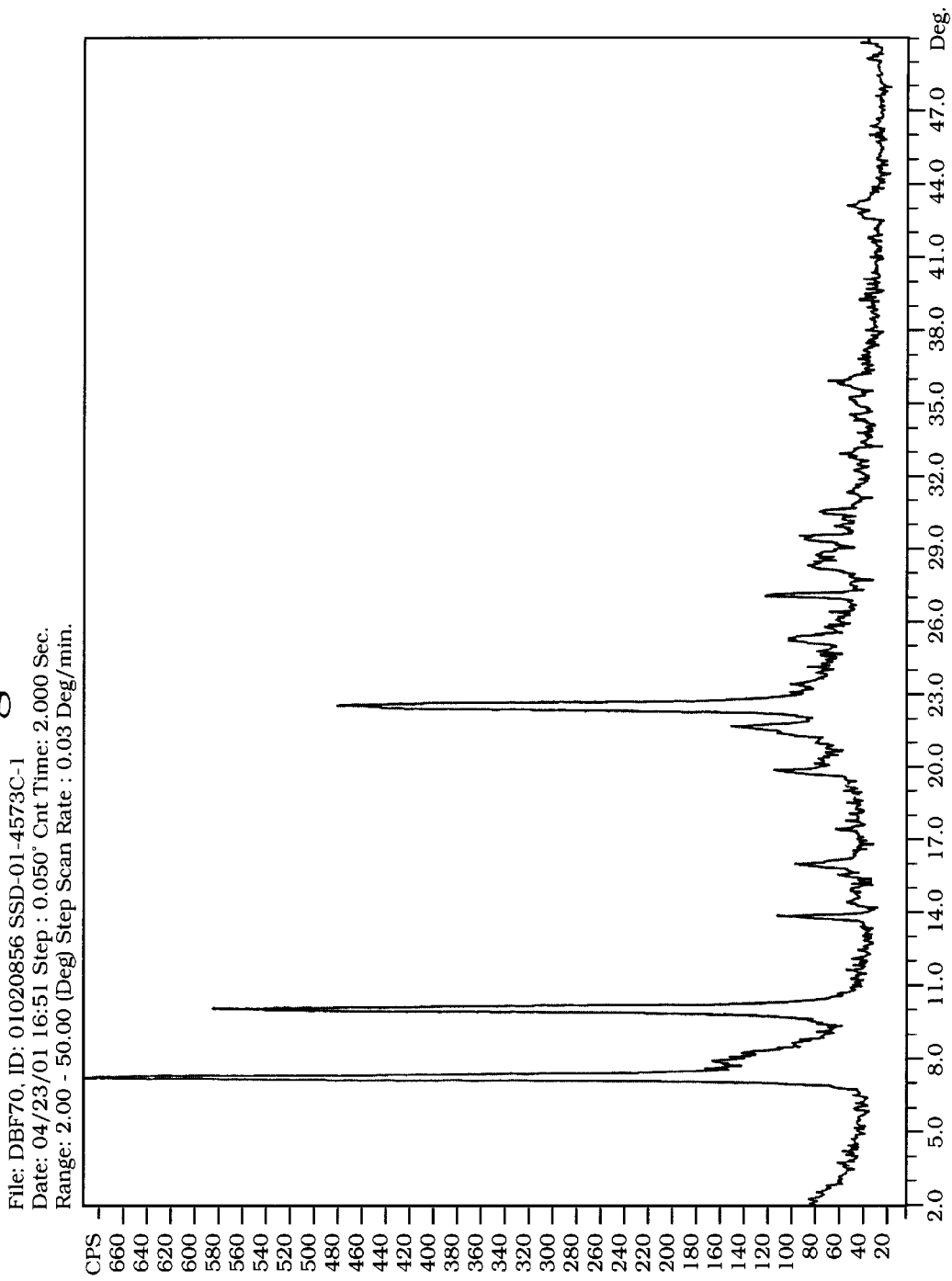

After the reaction was complete, the solid was recovered by filtration, washed with DI water and dried under infra-red lamps in air. The material thus obtained had the powder X-ray diffraction pattern for pure EMM-1 shown in FIG. 10. The as-synthesized material was calcined at 540° C. for 8 hours in nitrogen and subsequently for 8 hours in air. The calcined material had the X-ray pattern shown in FIG. 11 which indicated that the material contained traces of the polymorphs A and B of zeolite beta as seen by the presence of a broad peak around 8 degrees 2-theta.

EXAMPLE 7

Synthesis of EMM-1 Using Diquat-14 Dihydroxide 10.0 grams of Syton® HT-50 colloidal silica (50 wt % solution), 13.56 grams of Diquat-14 dihydroxide solution, 1.74 grams of germanium oxide and 1.40 grams of HF (48 wt %) were added to a 30 mL plastic bottle. The mixture was homogenized, the bottle was placed into an autoclave, and then the autoclave was ramped to 150° C. and held for 336 hours. The mole ratios of the reactants were as follows:

| | |
|---|---|
| $SiO_2$ | 1.0 |
| $GeO_2$ | 0.2 |
| Diquat-14 dihydroxide | 0.2 |
| HF | 0.4 |
| $H_2O$ | 9.0 |

Figure 12:
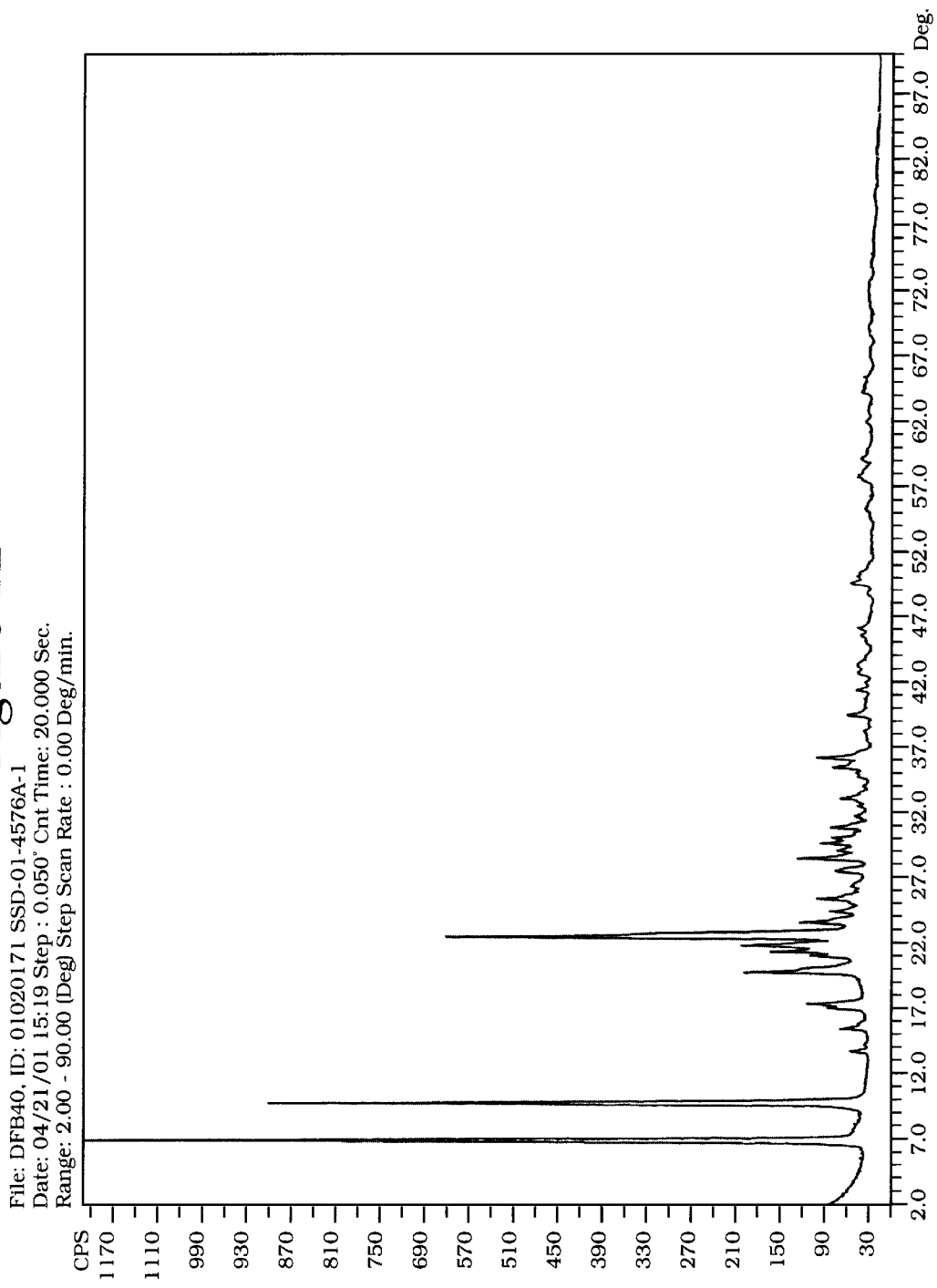
FIGS. 12 and 13 show the X-ray diffraction patterns of the as-synthesized and as-calcined products, respectively, of Example 7.
Figure 13:
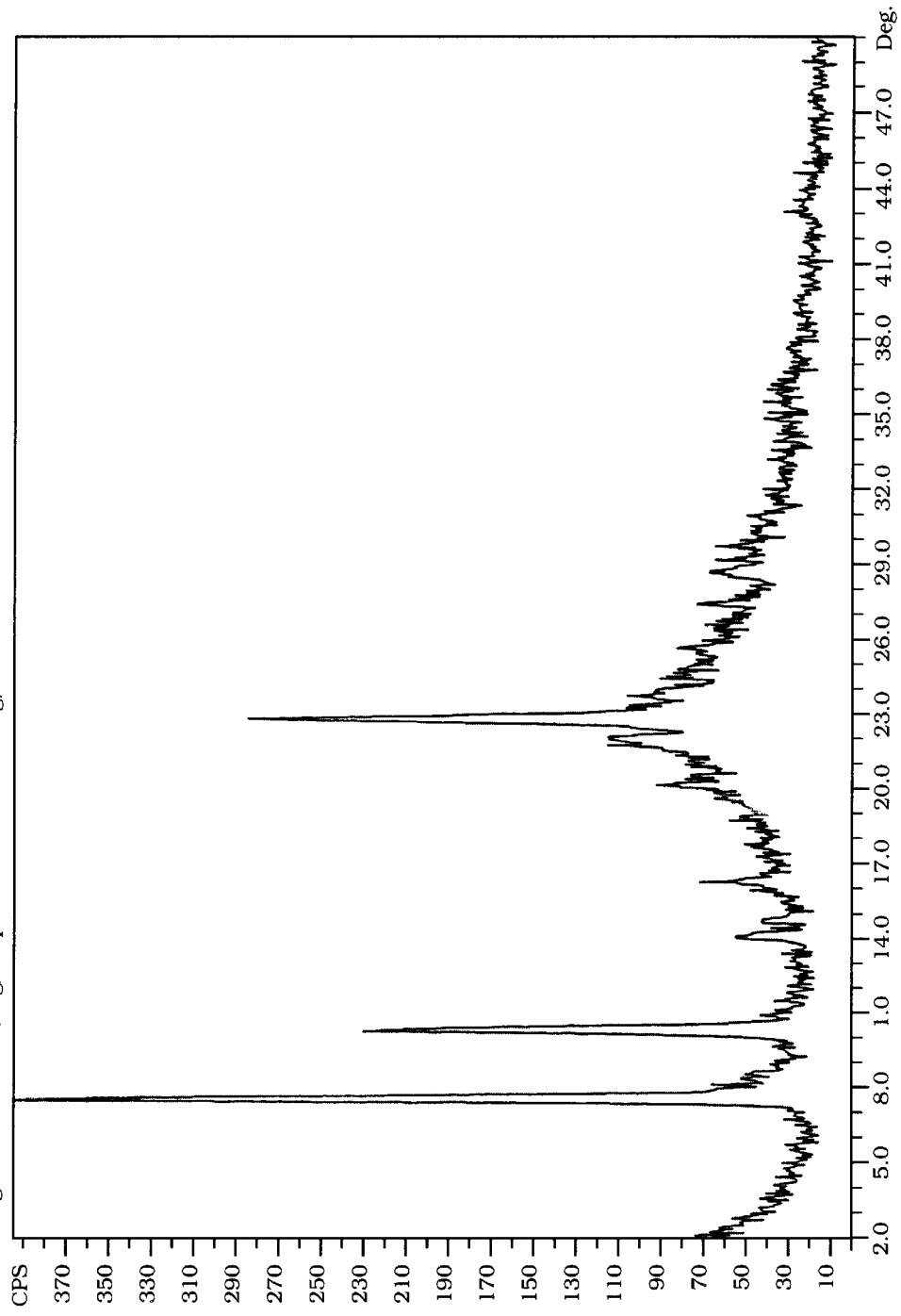

After the reaction was complete, the solid was recovered by filtration, washed with DI water and dried under infra-red lamps in air. The material thus obtained had the powder X-ray diffraction pattern for pure EMM-1 shown in FIG. 12. The as-synthesized material was calcined at 540° C. for 8 hours in nitrogen and subsequently for 8 hours in air. The calcined material had the X-ray pattern shown in FIG. 13, which indicated that the material contained EMM-1 and some amorphous solid.

EXAMPLE 8

Synthesis of EMM-1 Using Tetraethylammonium Hydroxide as 10.0 grams of Syton® HT-50 colloidal silica (50 wt % solution), 14.00 grams of tetraethylammonium hydroxide 35 wt % solution, 4.35 grams of germanium oxide and 1.40 grams of HF (48 wt %) were added to a 30 mL plastic bottle. The mixture was homogenized, the bottle was placed into an autoclave, and then the autoclave was ramped to 150° C. and held for 468 hours. The reactants mole ratios are given below.

| | |
|---|---|
| $SiO_2$ | 1.0 |
| $GeO_2$ | 0.5 |
| Tetraethylammonium hydroxide | 0.4 |
| HF | 0.4 |
| $H_2O$ | 9.9 |

Figure 14:
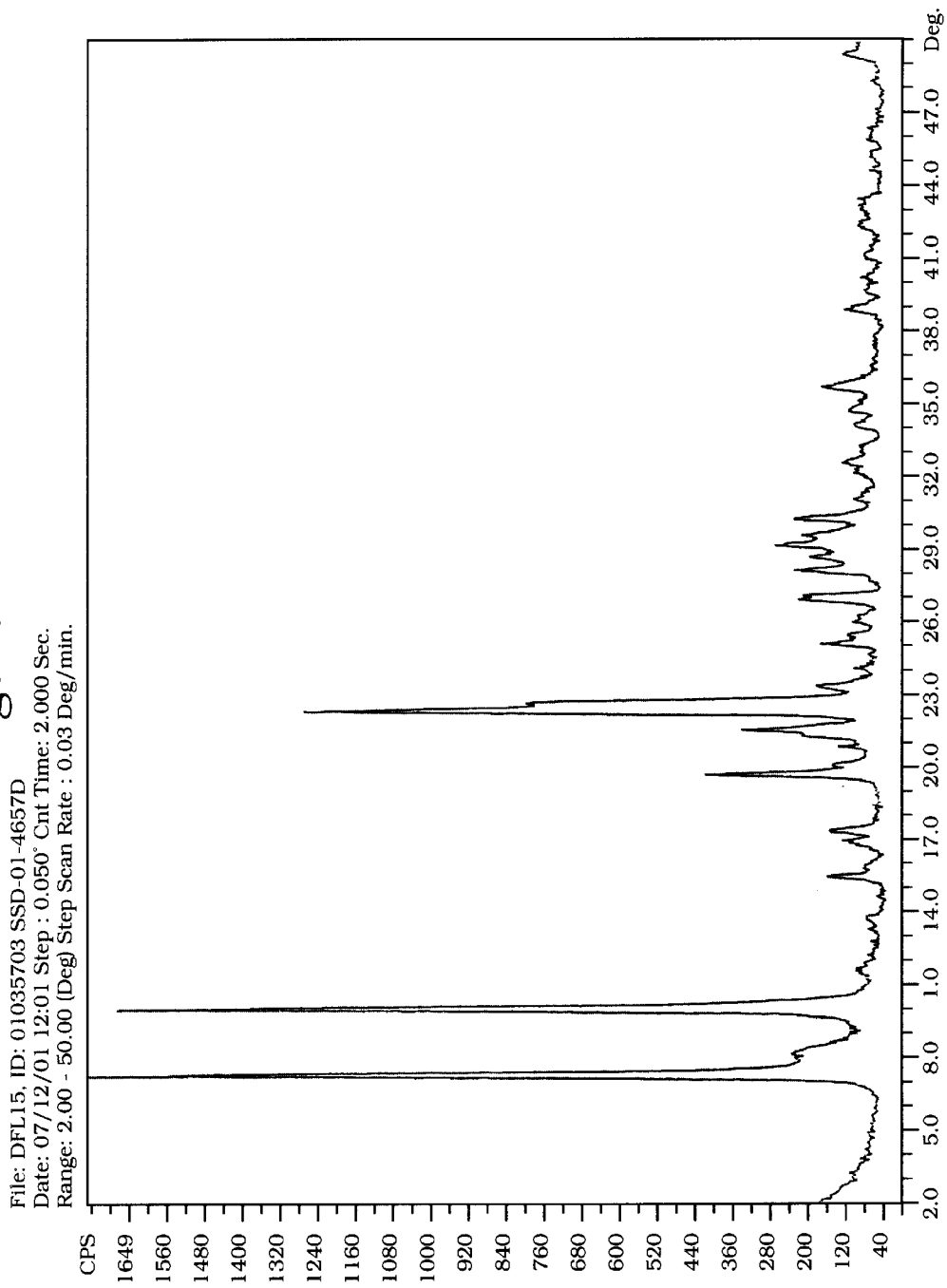
FIG. 14 shows the X-ray diffraction patterns of the as-synthesized product of Example 8.

After the reaction was complete, the solid was recovered by filtration, washed with DI water and dried under infra-red lamps in air. The material thus obtained had the powder X-ray diffraction pattern shown in FIG. 14, which indicated the presence of trace amounts of zeolite beta polymorphs A and B in addition to the desired EMM-1.

EXAMPLE 9

Synthesis of EMM-1, Using Diquat-6 Dihydroxide 10.0 grams of Syton® HT-50 colloidal silica (50 wt % solution), 9.37 grams of Diquat-6 dihydroxide 42 wt % solution (obtained by anion exchange of commercially available Diquat-6 bromide), 4.35 grams of germanium oxide and 1.40 grams of HF (48 wt %) were added to a 30 mL plastic bottle. The mixture was homogenized, the bottle was placed into an autoclave, and then the autoclave was ramped to 150° C. and held for 132 hours. The reactants mole ratios are given below.

| | |
|---|---|
| $SiO_2$ | 1.0 |
| $GeO_2$ | 0.5 |
| Diquat-6 dihydroxide | 0.2 |
| HF | 0.4 |
| $H_2O$ | 7.5 |

Figure 15:
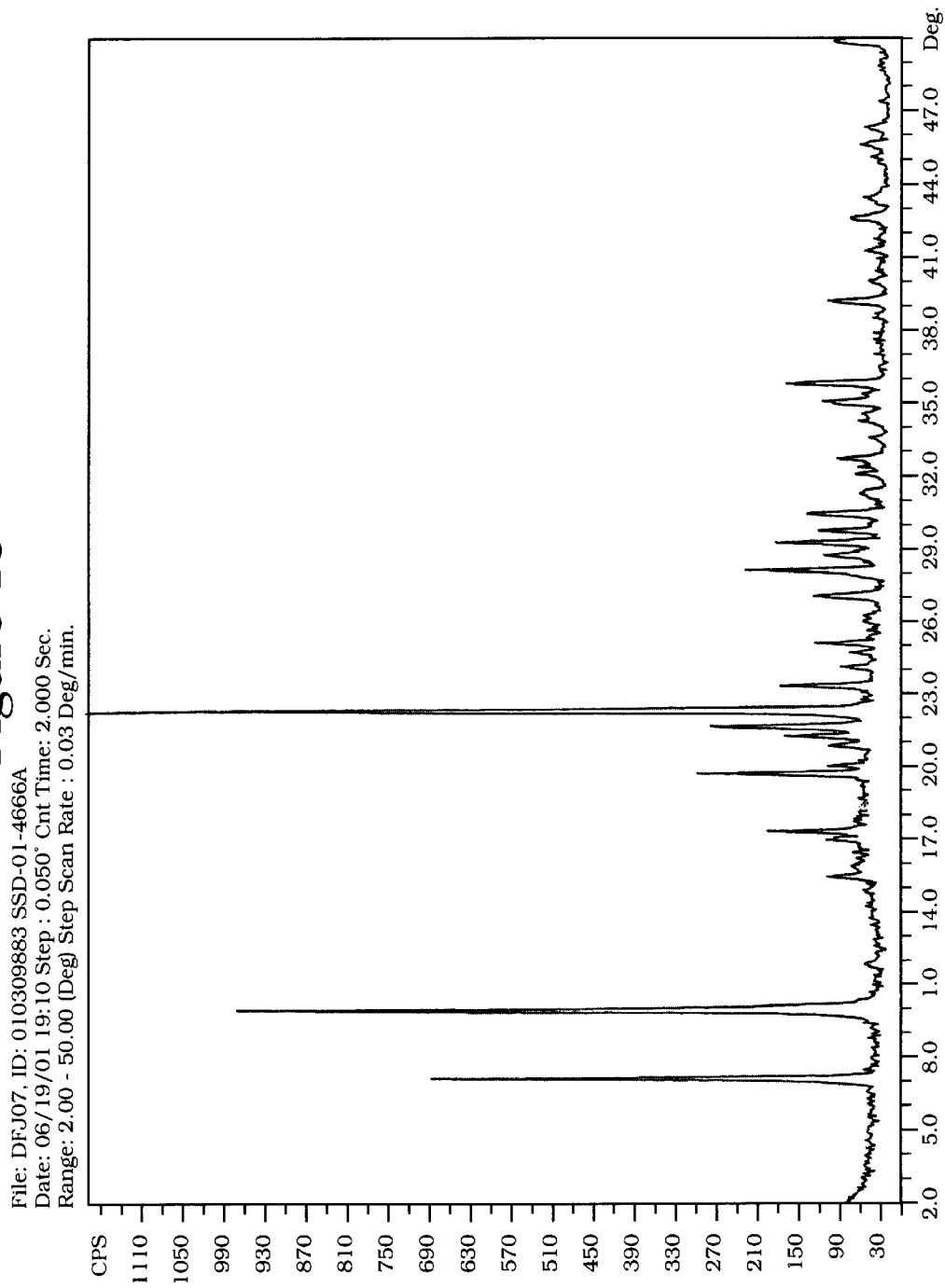
FIGS. 15 and 16 show the X-ray diffraction patterns of the products of Example 9 after crystallization for 132 and 468 hours, respectively.
Figure 16:
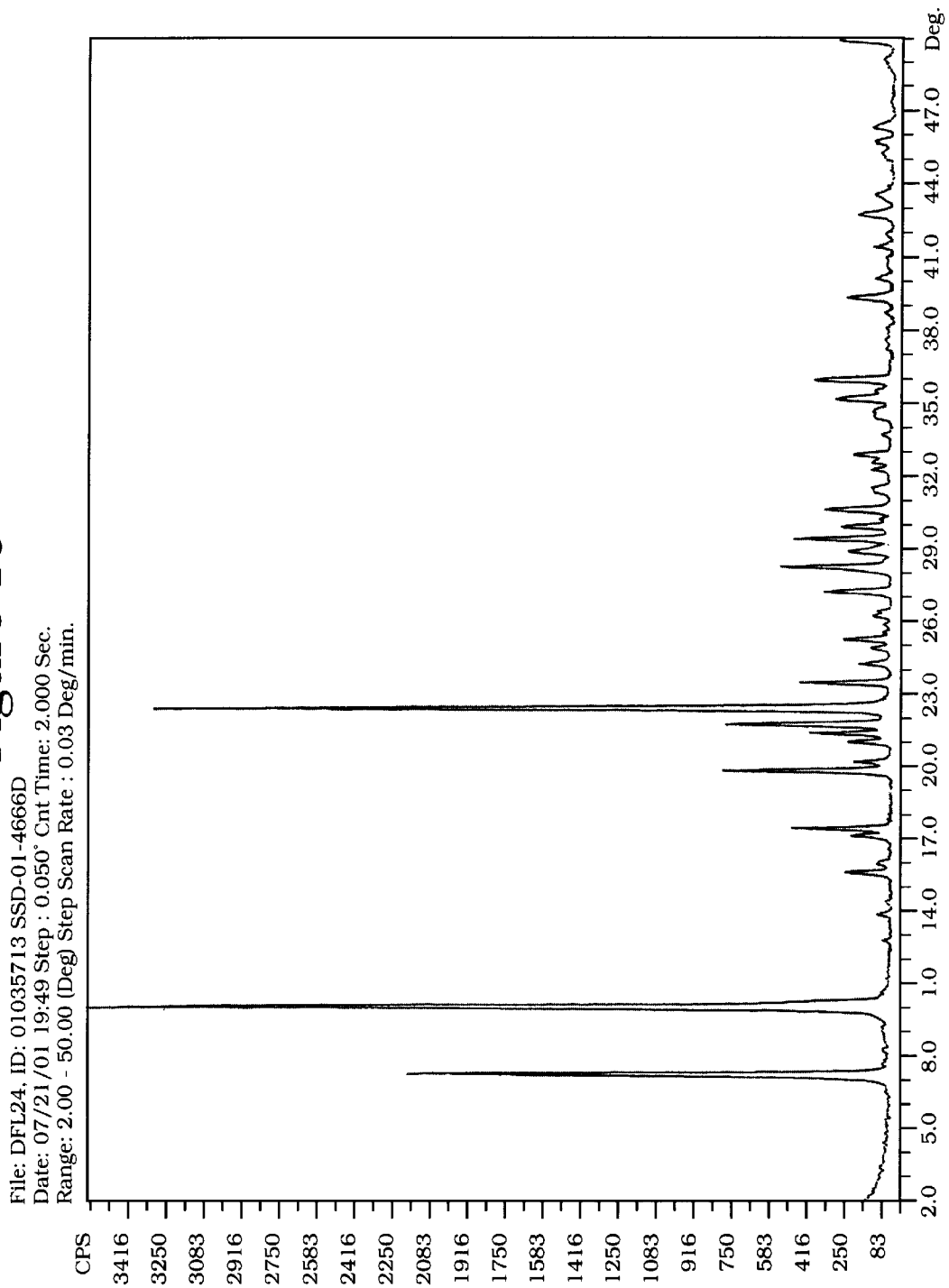

After the reaction was complete, the solid was recovered by filtration, washed with DI water and dried under infra-red lamps in air. The material thus obtained had the powder X-ray diffraction pattern for pure EMM-1 shown in FIG. 15. However, on continuing the reaction for another 168 hours (300 hours in total), the pattern became sharper, whereas continuing the reaction for a further reaction of 336 hours (468 hours in total) gave even a better powder pattern (FIG. 16).

EXAMPLE 10

Synthesis of Boron Containing EMM-1, Using Diquat-6 Dihydroxide 10.0 grams of Syton® HT-50 colloidal silica (50 wt % solution), 7.17 grams of Diquat-6 dihydroxide solution (54.9 wt % solution), 3.05 grams of germanium oxide, 51 mg $H_3BO_3$, 1.91 grams of HF (48 wt %), 1.93 g $H_2O$, and 200 mg EMM-1 seeds (product of Example 9) were added to a 30 mL plastic bottle. The mixture was homogenized, the bottle was placed into an autoclave, and then the autoclave was ramped to 150° C. and held for 14 days. The mole ratios of the reactants were as follows:

| | |
|---|---|
| $SiO_2$ | 1.0 |
| $GeO_2$ | 0.35 |
| $H_3BO_3$ | 0.01 |
| Diquat-6 dihydroxide | 0.2 |
| HF | 0.55 |
| $H_2O$ | 7.4 |

Figure 17:
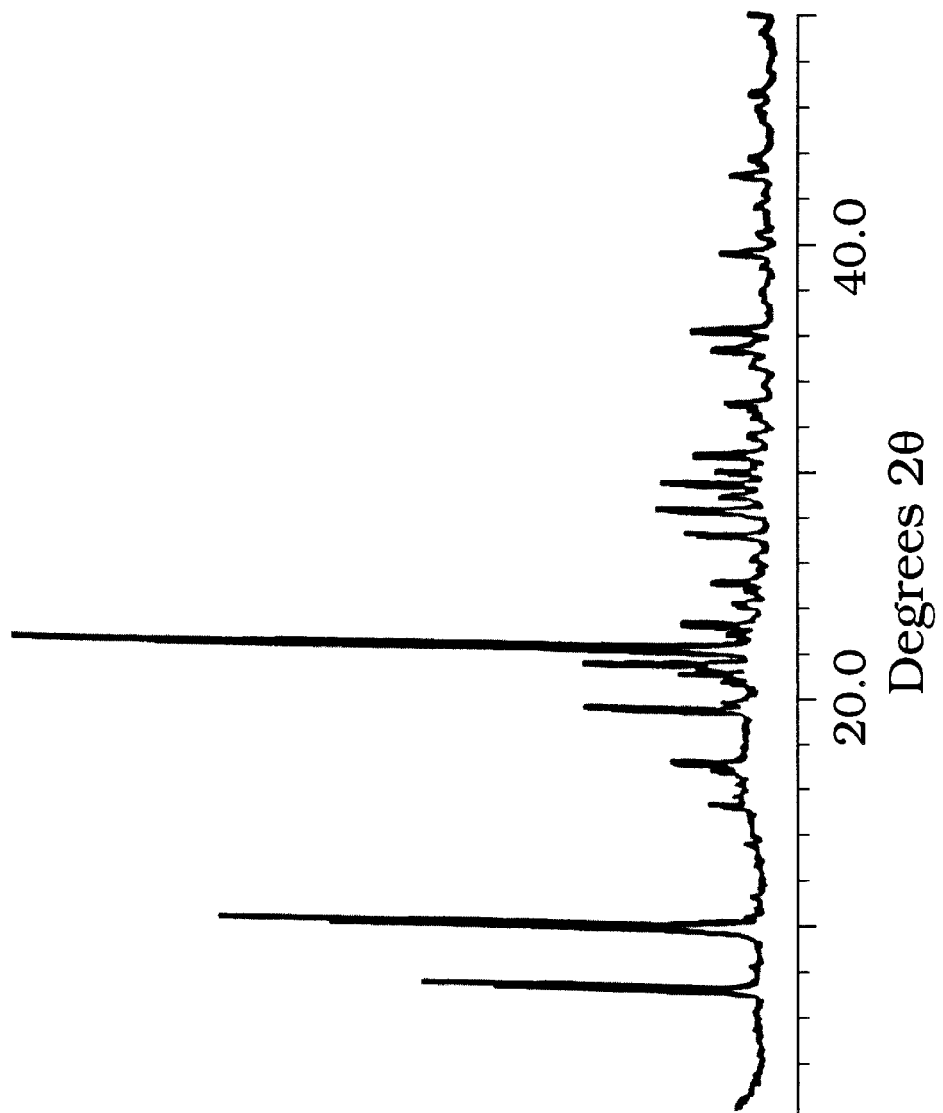
FIG. 17 shows the X-ray diffraction pattern of the product of Example 1.

After the reaction was complete, the solid was recovered by filtration, washed with DI water and dried under infra-red lamps in air. The material thus obtained had the powder X-ray diffraction pattern for EMM-1 shown in FIG. 17.

What is claimed is:

1. A synthetic porous crystalline material comprising a framework of tetrahedral atoms bridged by oxygen atoms, the tetrahedral atom framework being defined by a unit cell with atomic coordinates in nanometers shown in Table 1, wherein each coordinate position may vary within ±0.05 nanometer.

2. A synthetic porous crystalline material characterized by an X-ray diffraction pattern including values substantially as set forth in Table 2 of the specification.

3. The crystalline material of claim 2 having a composition comprising the molar relationship $X_2O_3$:(n)$YO_2$, wherein n is at least about 35, X is a trivalent element, and Y is a tetravalent element.

4. The crystalline material of claim 3 wherein Y comprises germanium and the mole fraction of germanium in Y are 0.2 to 0.5.

5. The crystalline material of claim 4 having a composition, on an anhydrous basis and in terms of moles of oxides per mole of $YO_2$, expressed by the formula:

(0.1–0.5)R:(1/n)$X_2O_3$:$YO_2$:(0.1–0.5)F wherein R is an organic moiety.

6. The crystalline material of claim 5 wherein R is an organic moiety selected from the group consisting of tetraethylammonium cations, benzyltrimethylammonium cations, bicyclo $NEt_4$ diquat dications, Diquat-6 dications, Diquat-10 dications, Diquat-11 dications, Diquat-14 dications and (methylpiperidine)$_2$ Diquat$_2$ dications.

7. A method for synthesizing a crystalline material as claimed in claim 2 which comprises the steps of:
    (i) preparing a mixture capable of forming said material, said mixture comprising sources of water, an oxide of a tetravalent element Y, wherein Y comprises germanium and the mole fraction of germanium in Y is 0.2 to 0.5, an oxide of a trivalent element X, wherein X is selected from the group consisting of aluminum, boron, gallium, iron, and indium, fluoride ions, and an organic directing agent (R), wherein R is selected from group consisting of tetraethylammonium cations, benzyltrimethylammonium cations, bicyclo $NEt_4$ diquat dications, Diquat-6 dications, Diquat-10 dications, Diquat-11 dications, Diquat-14 dications and $(methylpiperidine)_2$ $Diquat_2$ dications, said reaction mixture having a composition, in terms of mole ratios of oxides, within the following ranges:

| | |
|---|---|
| $H_2O/YO_2$ | 3 to 10 |
| $F/YO_2$ | 0.1 to 0.5 |
| $R/YO_2$ | 0.1 to 0.5 |
| $X_2O_3/YO_2$ | 0 to 0.03 |

(ii) maintaining said mixture under sufficient conditions including a temperature of from about 135° C. to about 165° C. until crystals of said material are formed; and (iii) recovering said crystalline material from step (ii).

8. The method of claim 7 wherein the mixture has a composition, in terms of mole ratios, within the following ranges:

| | |
|---|---|
| $H_2O/YO_2$ | 4 to 8 |
| $F/YO_2$ | 0.2 to 0.4 |
| $R/YO_2$ | 0.13 to 0.25 |
| $X_2O_3/YO_2$ | 0 to 0.01. |

9. The method of claim 7 including the additional step of calcining the material recovered in step (iii).

10. A process for converting a feedstock comprising organic compounds to conversion product which comprises contacting said feedstock at organic compound conversion conditions with a catalyst comprising an active form of the synthetic porous crystalline material of claim 2.

* * * * *